United States Patent
Hammes et al.

(10) Patent No.: US 8,681,045 B2
(45) Date of Patent: Mar. 25, 2014

(54) HYBRID SATELLITE POSITIONING RECEIVER

(75) Inventors: Markus Hammes, Dinslaken (DE); Christian Kranz, Ratingen (DE); Andre' Neubauer, Duesseldorf (DE)

(73) Assignee: Intel Mobile Communications GmbH, Neubiberg (DE)

( * ) Notice: Subject to any disclaimer, the term of this patent is extended or adjusted under 35 U.S.C. 154(b) by 382 days.

(21) Appl. No.: 12/833,720

(22) Filed: Jul. 9, 2010

(65) Prior Publication Data
US 2012/0007777 A1 Jan. 12, 2012

(51) Int. Cl.
*G01S 19/33* (2010.01)

(52) U.S. Cl.
USPC .................................. 342/357.73

(58) Field of Classification Search
USPC ............. 342/357.39, 357.46, 357.51, 357.73, 342/357.77; 701/468; 370/316
See application file for complete search history.

(56) References Cited

U.S. PATENT DOCUMENTS

| | | | |
|---|---|---|---|
| 5,923,287 A | 7/1999 | Lennen | |
| 6,081,691 A | 6/2000 | Renard et al. | |
| 6,600,909 B1 | 7/2003 | Nikulin | |
| 6,816,539 B1 | 11/2004 | Rog | |
| 6,967,992 B1 | 11/2005 | Rabaeijs | |
| 7,460,615 B2 | 12/2008 | Kunysz | |
| 2005/0242990 A1* | 11/2005 | Lawrence et al. | 342/357.12 |
| 2007/0241960 A1* | 10/2007 | Feller | 342/357.08 |
| 2010/0265875 A1* | 10/2010 | Zhao et al. | 370/316 |

FOREIGN PATENT DOCUMENTS

| | | |
|---|---|---|
| CN | 101150352 A | 3/2008 |
| CN | 101303403 A | 11/2008 |
| CN | 101634696 A | 1/2010 |
| KR | 10-0895886 | 5/2009 |
| KR | 1020100077541 | 7/2010 |

OTHER PUBLICATIONS

Global Navigation Satellite System GLONASS Interface Control, Edition 5.1, Dec. 2008.
Global Positioning System Standard Positioning Service Signal Specification, 2nd Edition, Jun. 2, 1995.

* cited by examiner

*Primary Examiner* — Dao Phan
(74) *Attorney, Agent, or Firm* — SpryIP, LLC

(57) ABSTRACT

A hybrid satellite positioning receiver architecture is provided with a first receive path and a second receive path. The first receive path downconverts received satellite positioning signals of a first type to an intermediate frequency range, and the second receive path downconverts received satellite positioning signals of a second type to the same intermediate frequency range.

26 Claims, 12 Drawing Sheets

| No. of Channel | Nominal value of frequency in L1 sub-band (MHz) | No. of Channel | Nominal value of frequency in L2 sub-band (MHz) |
|---|---|---|---|
| 06 | 1605.375 | 06 | 1248.625 |
| 05 | 1604.8125 | 05 | 1248.1875 |
| 04 | 1604.25 | 04 | 1247.75 |
| 03 | 1603.6875 | 03 | 1247.3125 |
| 02 | 1603.125 | 02 | 1246.875 |
| 01 | 1602.5625 | 01 | 1246.4375 |
| 00 | 1602.0 | 00 | 1246.0 |
| -01 | 1601.4375 | -01 | 1245.5625 |
| -02 | 1600.875 | -02 | 1245.125 |
| -03 | 1600.3125 | -03 | 1244.6875 |
| -04 | 1599.75 | -04 | 1244.25 |
| -05 | 1599.1875 | -05 | 1243.8125 |
| -06 | 1598.625 | -06 | 1243.375 |
| -07 | 1598.0625 | -07 | 1242.9375 |

HYBRID SATELLITE POSITIONING RECEIVER

FIELD OF THE INVENTION

The present invention relates to techniques for receiving satellite navigation standards of different satellite positioning systems.

BACKGROUND OF THE INVENTION

By means of a satellite-based positioning system the geographical position of an end device may be determined. This is accomplished by measuring the distance of the end device to a certain number of positioning satellites. For this purpose, each positioning satellite typically transmits a positioning signal, which is received by a positioning receiver in the end device. Examples of satellite-based positioning systems are GPS (Global Positioning System) operated by the United States of America, Galileo operated by the European Union, and GLONASS (Global Navigation Satellite System) operated by the Russian Federation.

Due to differences between the different types of satellite-based positioning systems, dedicated positioning receivers are typically used to receive the positioning signals. At the same time, there is a need to provide end devices with the possibility to use more than one satellite-based positioning system. For example, this may be desirable if one satellite-based positioning system is not operable, e.g. due to the signals from the positioning satellites not being receivable, or if positioning accuracy can be improved by switching to another type of satellite-based positioning system. Accordingly, there is a need for efficient techniques which allow an end device to use different types of satellite-based communication systems.

BRIEF DESCRIPTION OF THE SEVERAL VIEWS OF THE DRAWINGS

FIG. 2 shows a table for illustrating carrier frequencies of GLONASS satellite positioning signals.

Figure 1:
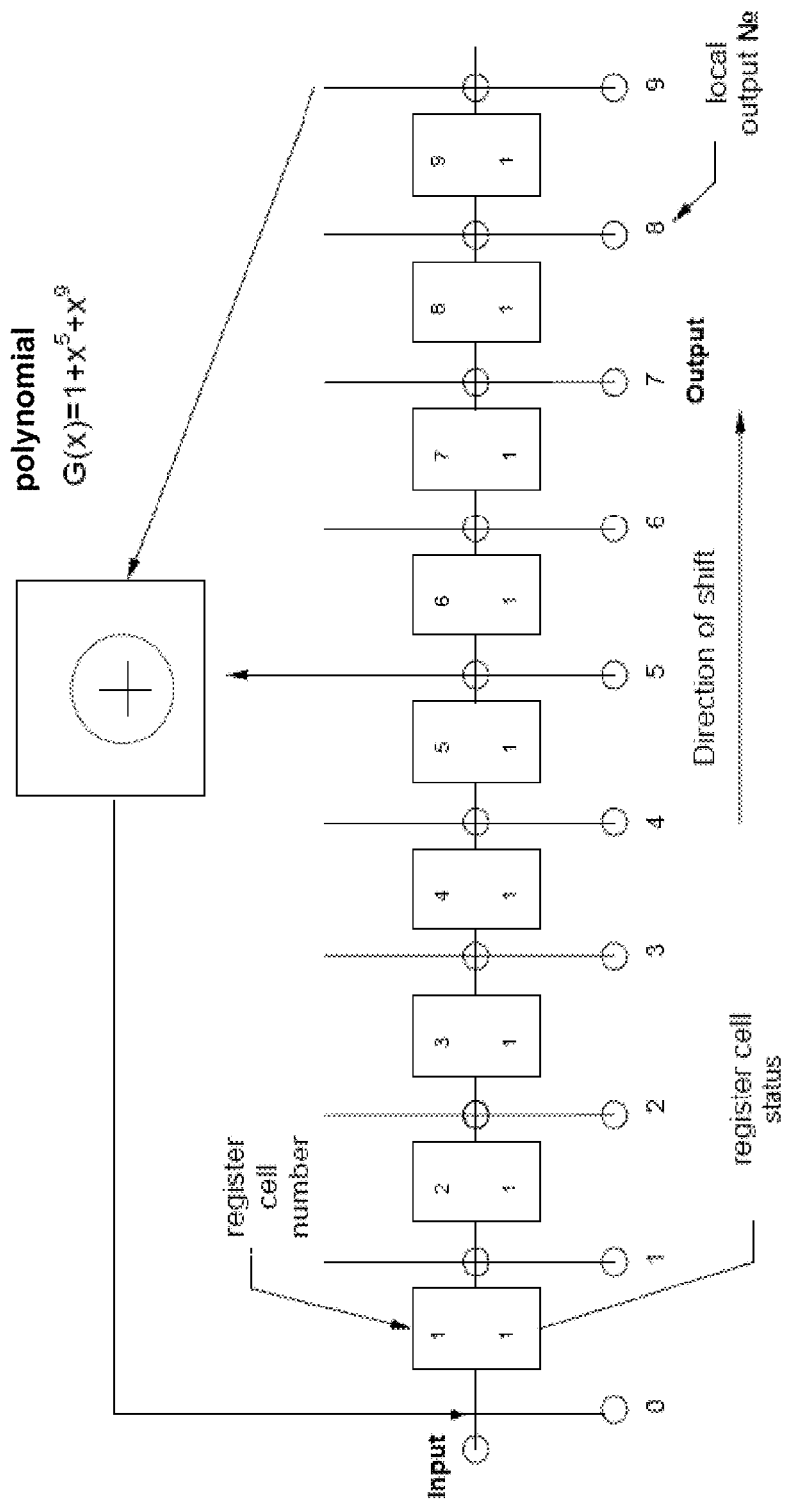
FIG. 1 schematically illustrates generating GLONASS satellite positioning signals by means of a linear feedback shift register.

In the following, some embodiments of the present invention will be described in more detail and with reference to the accompanying drawings. It is to be understood that the following description is given only for the purpose of illustration and is not to be taken in a limiting sense. The scope of the invention is not intended to be limited by the embodiments as described hereinafter, but is intended to be limited only by the appended claims.

Further, it is to be understood that in the following description of embodiments any direct connection or coupling between functional blocks, devices, components, circuit elements or other physical or functional units as described or shown in the drawings could also be implemented by an indirect connection or coupling, i.e. a connection or coupling comprising one or more intervening elements. Furthermore, it should be appreciated that functional blocks or units shown in the drawings may be implemented as separate circuits, but may also be fully or partially implemented in a common circuit. In other words, the description of various functional blocks is intended to give a clear understanding of various functions performed in a device and is not to be construed as indicating that these functional blocks have to be implemented as separate functional units. For example, one or more functional blocks may be implemented by programming a processor with suitably designed program code.

It should be noted that the drawings are provided to give an illustration of some aspects of embodiments of the present invention and therefore are to be regarded as schematic only. In particular, the elements as shown in the drawings are not necessarily to scale with each other, and the placement of various elements and drawings is chosen to provide a clear understanding of the respective embodiment and is not to be construed as necessarily being a representation of the actual relative location of the illustrated structures.

It is to be understood that the features of the various embodiments described herein may be combined with each other as appropriate. On the other hand, describing an embodiment with a plurality of features is not to be construed as indicating that all the described features are necessary for practicing the present invention. For example, other embodiments may comprise less features and/or alternative features.

In the following, embodiments of the invention will be described, which relate to a hybrid positioning receiver architecture operable to receive both satellite positioning signals of a first type and satellite positioning signals of a second type. In the illustrated examples, satellite positioning signals of the first type may be GPS satellite positioning signals, and satellite positioning signals of the second type are GLONASS satellite positioning signals. However, it is to be understood that the concepts as described herein could be applied to other types of satellite positioning signals as well.

In order to facilitate understanding of the concepts as described herein, some features of the GPS and GLONASS positioning systems will be explained.

The GLONASS satellite positioning signals are transmitted on multiple carrier signals having particular carrier frequencies individually assigned to different satellites, using bipolar phase-shift keying. The carrier frequencies are located in L1 and L2 subbands. The carrier signal is modulated by a modulo-2 addition of the following binary signals: a pseudo-random (PR) ranging code serving as a spreading sequence used by all satellites, digital navigation message data, and an auxiliary meander sequence.

More specifically, the GLONASS ranging code is formed by an M-sequence having a period of 1 ms and a chip rate of 511 kchip/s. As schematically illustrated in FIG. 1, the GLONASS ranging code is generated by a linear feedback shift register defined by a polynomial $g(z)=1+z^5+z^9$. The GLONASS ranging code has a length of $2^9-1=511$. The navigation message data is transmitted using a bitrate of 50 bit/s.

The GLONASS positioning satellites are thus uniquely distinguishable on the basis of different individual carrier frequencies respectively assigned to the different GLONASS positioning satellites. More specifically, a frequency division multiple access (FDMA) scheme is used to distinguish the satellite positioning signals received from different GLONASS positioning satellites. The table of FIG. 2 illustrates the channel frequencies as used according to the FDMA scheme. As can be seen, for each channel number k the L1 carrier frequency is given by $$f_{L1,k} = 1602 \text{MHz} + k \cdot 562.5 \text{ kHz},$$

and the L2 carrier frequency is given by $$f_{L2,k} = 1246 \text{MHz} + k \cdot 437.5 \text{ kHz}$$

according to the ratio $$f_{L2,k}/f_{L1,k} = 7/9.$$

In the years 1998 to 2005, the channel numbers k=0 . . . 12 were used. Since 2005, the channel numbers k=−7 . . . 6 are used, and the corresponding carrier frequencies are shown in the table of FIG. 2.

Further information about the GLONASS positioning system can be found in "Global Navigation Satellite System GLONASS Interface Control Document", Version 5.1, published by the Russian Institute of Space Engineering (Moscow 2008), which is incorporated herein by reference.

In the GPS satellite positioning system, each positioning satellite transmits a unique spreading sequence. The GPS positioning satellites are thus uniquely distinguishable on the basis of the individual spreading sequences which are respectively assigned to the different GPS positioning satellites. More specifically, a code division multiple access (CDMA) scheme is used to distinguish the satellite positioning signals received from different GPS positioning satellites.

The individual GPS spreading sequences of are based on Gold codes and are almost orthogonal to each other, which allow a positioning receiver to reliably differentiate between GPS satellite positioning signals received from different GPS positioning satellites. By way of example, the spreading sequence for GPS L1 C/A (coarse acquisition) is a Gold code having a length of 1023 bit and a chip rate of 1.023 Mchip/s, which corresponds to a spreading sequence length of 1 ms. The individual GPS spreading sequences of the different GPS positioning satellites are synchronized to each other by means of accurate atomic clocks of the GPS positioning satellites. Navigation message data is transmitted at a bitrate of 50 bit/s. The GPS positioning signals are transmitted using an L1 carrier frequency of 1575.42 MHz (=1540·1.023 MHz). Due to the rectangular chip pulse, the power spectral density of the GPS positioning signals is given by a sinc function with zero-to-zero bandwidth of 2.046 MHz (=2·1.023 MHz).

Further information about the GPS positioning system can be found in "Understanding GPS" by E. D. Kaplan, published by Artech House (1996), and in "Global Positioning System: Theory and Applications", by B. W. Parkinson and J. J. Spilker, published by the American Institute of Aeronautics and Astronautics (1996), and in "Global Positioning System Standard Positioning Service Signal Specification", $2^{nd}$ edition (1995), available from the Navigation Center of the U.S. Coast Guard, which are incorporated herein by reference.

In the positioning process, which may be based on either the above-mentioned GLONASS satellite positioning signals or the above-mentioned GPS satellite positioning signals, a positioning receiver measures the delay offset between the spreading sequences or ranging codes of at least four positioning satellites by coherently correlating the incoming satellite positioning signals with replicas of the ranging code. Together with the position of the positioning satellite and a timestamp as encoded in the navigation data, the delay offsets can be used to exactly determine the positioning receiver's position in three-dimensional space. As a result, the positioning receiver will typically output pseudoranges, which express the distances to the different satellites. A navigation software can then calculate a geographical position from the pseudoranges and the positioning satellites' positions by solving a set of nonlinear equations.

Figure 3:
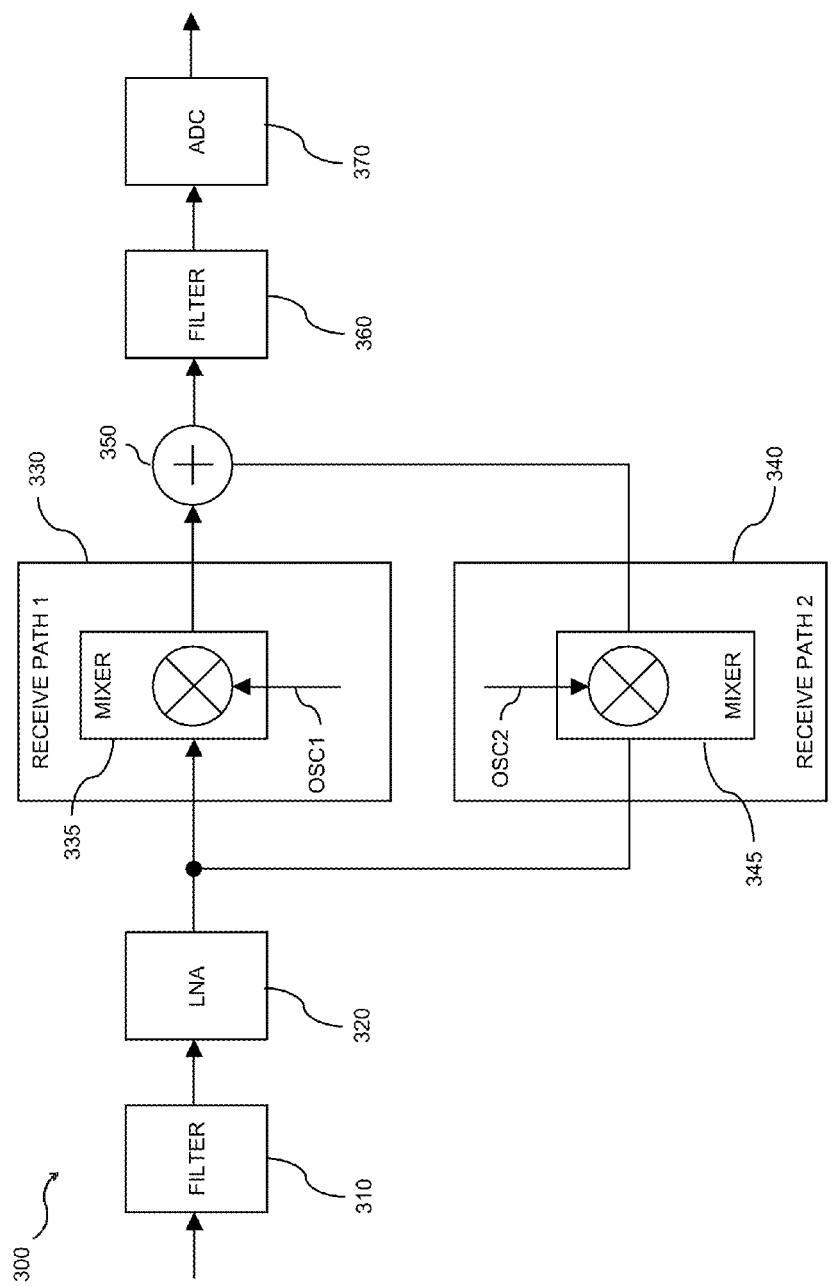
FIG. 3 schematically illustrates a circuit structure in a positioning receiver according to an embodiment of the invention.

FIG. 3 shows an exemplary implementation of radio frequency (RF) front-end circuitry 300 in a hybrid satellite positioning receiver according to an embodiment of the invention. The RF front-end circuitry 300 may be implemented in a single silicon chip. As illustrated, the RF front-end circuitry 300 includes a filter 310, an amplifier 320, a first receive path 330 with a mixer 335, a second receive path 340 with a mixer 345, a summing node 350, and an analog-to-digital converter 360.

The filter 310 filters a receive signal and outputs a filtered receive signal. The receive signal may be supplied to the filter 310 from an antenna (not illustrated) of the positioning receiver. The receive signal includes satellite positioning signals of a first type and satellite positioning of a second type. In the following, a specific embodiment will be described, in which the satellite positioning signals of the first type are GPS satellite positioning signals, and the satellite positioning of the second type are GLONASS satellite positioning signals. However, it is to be understood that other embodiments may use other combinations of different types of satellite positioning signals. Since the filter 310 is arranged at the input side of the circuitry 300, it may also be referred to as a prefilter. The filter 310 may be selected to have a filter characteristic which passes the satellite positioning signals of the first and second type. For example, if the satellite positioning signals of the first type and the second type are GPS satellite positioning signals and GLONASS positioning signals, the filter 310 may have a filter characteristic which passes signals having frequencies in the range of the L1 and L2 bands, i.e. between 1200 MHz and 1700 MHz.

The amplifier 320 amplifies the filtered receive signal from the filter 310 and outputs an amplified filtered receive signal. In the illustrated example, the amplifier is implemented as a low-noise amplifier (LNA) for satellite positioning applications. The amplified filtered receive signal is output in parallel to the first receive path 330 and the second receive path 340.

The first receive path 330 and the second receive path 340 are configured to accomplish downconversion of their respective input signals. For this purpose, the first receive path 330 is provided with the mixer 335, and the second receive path is provided with the mixer 345. The first receive path 330 downconverts the satellite positioning signals of the first type to an intermediate frequency range, and the second receive path 340 downconverts the satellite positioning signals of the second type to the same intermediate frequency range. In order to take into account that the satellite positioning signals of the first type and the satellite positioning signals of the second type are typically located in different frequency ranges, the mixers 335 and 345 are supplied with independently selected oscillator signals OSC1 and OSC2. The first receive path 330 outputs a first downconverted signal, and the second receive path 340 outputs a second downconverted signal.

The summing node 350 is supplied with the first and second downconverted signals and sums these signals so as to generate an intermediate frequency signal in which the downconverted satellite positioning signals of the first type and the downconverted satellite positioning signals of the second type are superposed.

The filter 360 filters the intermediate frequency signal generated by the summing node. The filter 360 is used as an intermediate frequency band-selection filter which has a band-pass characteristic configured to pass the signal frequencies in the intermediate frequency range. More specifically, the bandpass characteristic may have a pass-band width substantially corresponding to the bandwidth of the down-converted satellite positioning signals of that type which has the largest bandwidth, which at the same time defines the intermediate frequency range. Since the satellite positioning signals of both the first and second type have been downconverted to the same intermediate frequency range, the filter 360 may be tailored to this intermediate frequency range. The use of multiple intermediate frequency band-selection filters or of a reconfigurable intermediate band-selection filter is not necessary for processing both types of satellite positioning signals.

The analog-to-digital converter 370 samples the filtered intermediate frequency signal and generates digital baseband signal samples. That is to say, in the illustrated embodiment the analog-to-digital converter accomplishes both sampling and digital downconversion of the intermediate frequency signal to the baseband. In other embodiments, sampling and downconversion to the baseband may be accomplished by separate entities. The baseband signal samples may then be supplied to a baseband processing path.

In the baseband processing path, both types of satellite positioning signals may be extracted from the superposition in the sampled intermediate frequency signal. For example, GPS positioning signals may be extracted using the Gold spreading sequences and their mutual cross-correlation properties. Similarly, GLONASS satellite positioning signals may be extracted using the known carrier frequency allocations of the FDMA scheme. For both types of satellite positioning signals, usual corrections of the Doppler frequency offset may be applied, e.g. during acquisition and/or tracking. The baseband processing path will typically output pseudoranges with respect to a number of positioning satellites.

Figure 4:
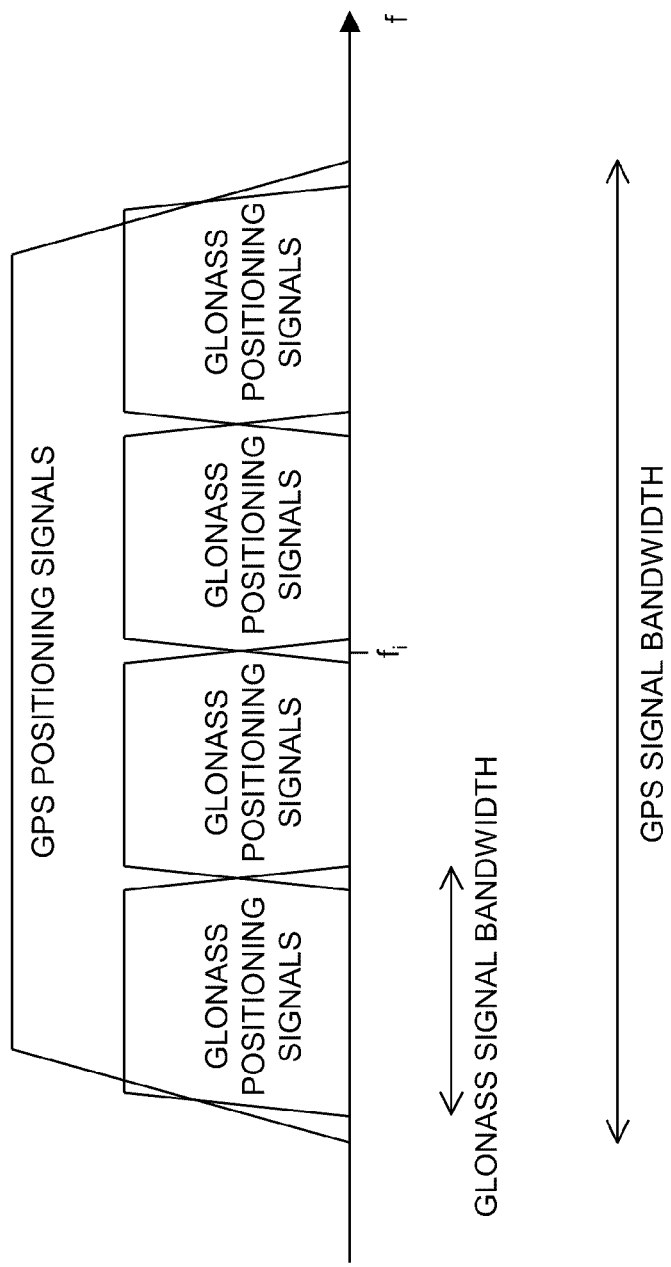
FIG. 4 schematically illustrates downconverted satellite positioning signals as used in an embodiment of the invention.

FIG. 4 shows illustrates the downconversion process of the first receive path 330 and the second receive path 340 by referring to exemplary GPS satellite positioning signals and GLONASS satellite positioning signals. For example, the GPS satellite positioning signals may be downconverted by the first receive path 330, and the GLONASS satellite positioning signals may be downconverted by the second receive path 340.

As illustrated in FIG. 4, the downconverted GPS positioning signals cover an intermediate frequency range which is centered around an intermediate frequency $f_i$. Downconversion of the GLONASS satellite positioning signals is accomplished in such a way that a number of neighbouring GLONASS channels are downconverted to the same intermediate frequency range, i.e. are located to be substantially within the bandwidth of the downconverted GPS satellite positioning signals. In the illustrated example, the number of neighbouring GLONASS channels downconverted into the same intermediate frequency range is four. In other implementations, a smaller or a larger number of neighbouring GLONASS channels could be downconverted to the same intermediate frequency range. Accordingly, signal processing circuitry which is designed to process signals in the intermediate frequency range defined by the bandwidth of the downconverted GPS signals may be used to process both the downconverted GPS satellite positioning signals and the down-converted GLONASS satellite positioning signals.

Figure 5:
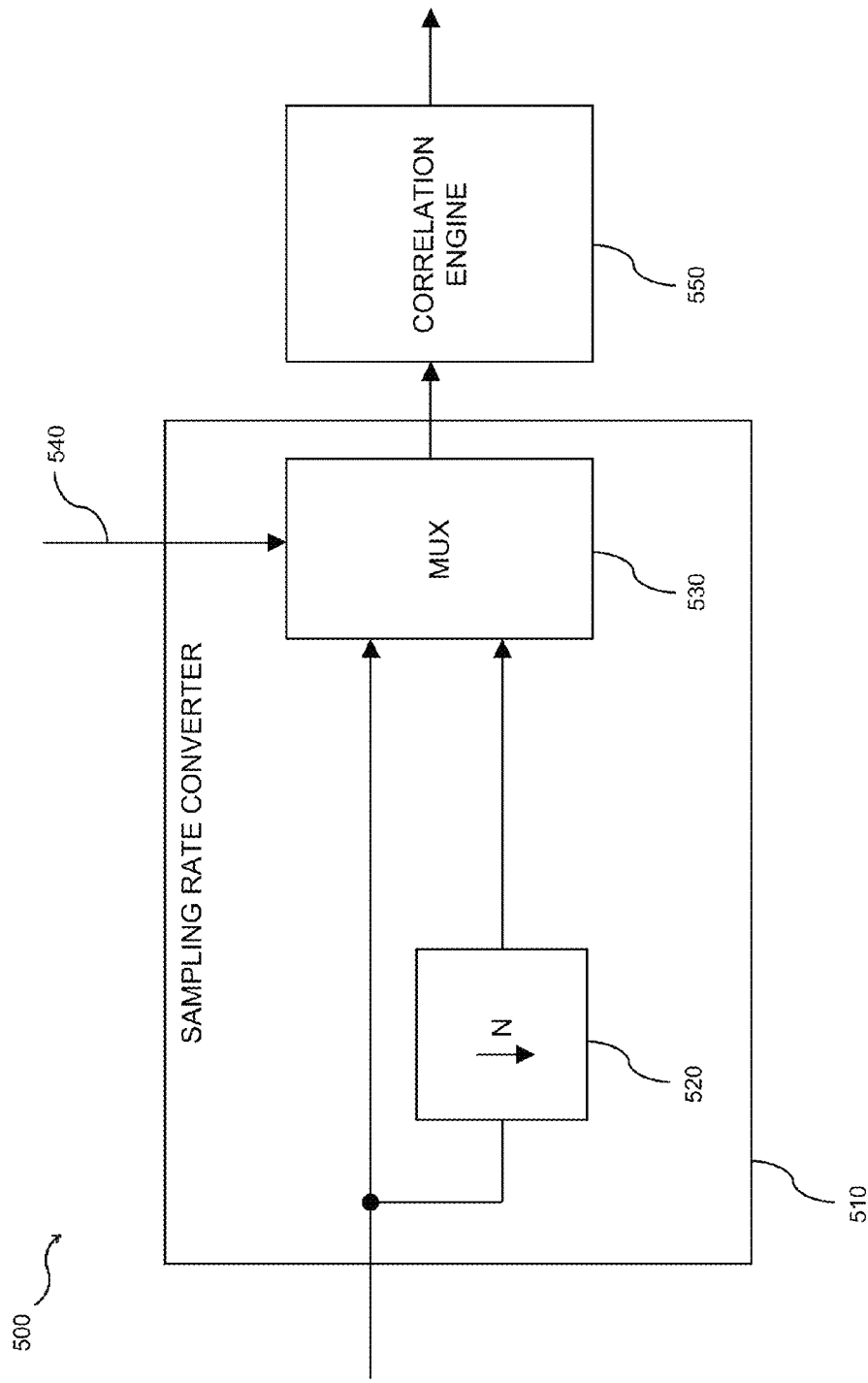
FIG. 5 schematically illustrates code correlation circuitry as used in an embodiment of the invention.

FIG. 5 schematically illustrates an exemplary implementation of code correlation circuitry 500 as used in an embodiment of the invention. The code correlation circuitry 500 may be implemented on a single silicon chip, e.g. together with the RF front-end circuitry 300 of FIG. 3. The illustrated code correlation circuitry 500 is configured to address a situation in which a ranging code length of the satellite positioning signals of the first type is different from a ranging code length of the satellite positioning signals of the second type. For example, such a situation is present in the example of GPS satellite positioning signals and GLONASS satellite positioning signals. As mentioned above, the ranging code of GPS satellite positioning signals has a length of 1023 bit, and the ranging code of GLONASS satellite positioning signals has a length of 511 bit. If the ranging codes differ in length by at least a factor of two, a correlator designed to accomplish code correlation of the longer ranging code can be reused to accomplish code correlation of two or more of the shorter ranging codes in parallel. For this purpose, the baseband samples supplied to the correlator may be subjected to a selective sampling rate conversion. More specifically, if the correlator is to perform code correlation on the basis of the longer ranging code, the sampling rate may be left unchanged. And, if the correlator is to perform code correlation of two or more of the shorter ranging codes in parallel, the sampling rate may be reduced by a respective factor.

The code correlation circuitry 500 as illustrated in FIG. 5 may be used to selectively accomplish code correlation of a GPS ranging code or of two GLONASS ranging codes in parallel. As illustrated, the code correlation circuitry 500 includes a sampling rate converter 510 and a correlation engine 550. The sampling rate converter 510 receives, baseband signal samples, e.g. as generated by the circuitry 300 of FIG. 3, and selectively downsamples the baseband signal samples so as to compensate for different ranging code lengths. For this purpose, the sampling rate converter 510 includes a downsampler having a downsampling factor N and a multiplexer 530 controlled by a control signal 540. The multiplexer 530 selectively forwards either the input signal of the downsampler 520 or the output signal of the downsampler 520, i.e. is operable to selectively bypass the downsampler 520. The downsampling factor N depends on the length difference of the ranging codes. In the example of GPS satellite positioning signals and GLONASS positioning signals, the GPS ranging code length is 1023 and the GLONASS ranging code length is 511, i.e. the ranging code lengths differ by a little more than a factor of two. In this scenario, the downsampling factor N would be selected to be two. In more general, the downsampling factor corresponds to the number of the shorter ranging codes which are to be processed in parallel in the correlation engine 550.

Selective sampling rate conversion is accomplished in the following manner: If code correlation is to be performed on the basis of the longer ranging code, the multiplexer 530 bypasses the downsampler 520, and the sampling rate of the baseband signal samples is left unchanged. If code correlation is to be performed on the basis of two or more of the shorter ranging codes in parallel, the multiplexer forwards the output signal of the downsampler 520 to the correlation enginge 550, thereby providing the correlation engine with appropriately downsampled baseband samples. Returning to the example of GPS satellite positioning signals and GLONASS positioning signals, the baseband signal samples are forwarded to the correlation engine with unchanged sampling when performing code correlation on the basis of the longer GPS ranging codes, and the baseband signal samples are downsampled by a factor of two when performing code correlation on the basis of the shorter GLONASS ranging code.

Figure 6:
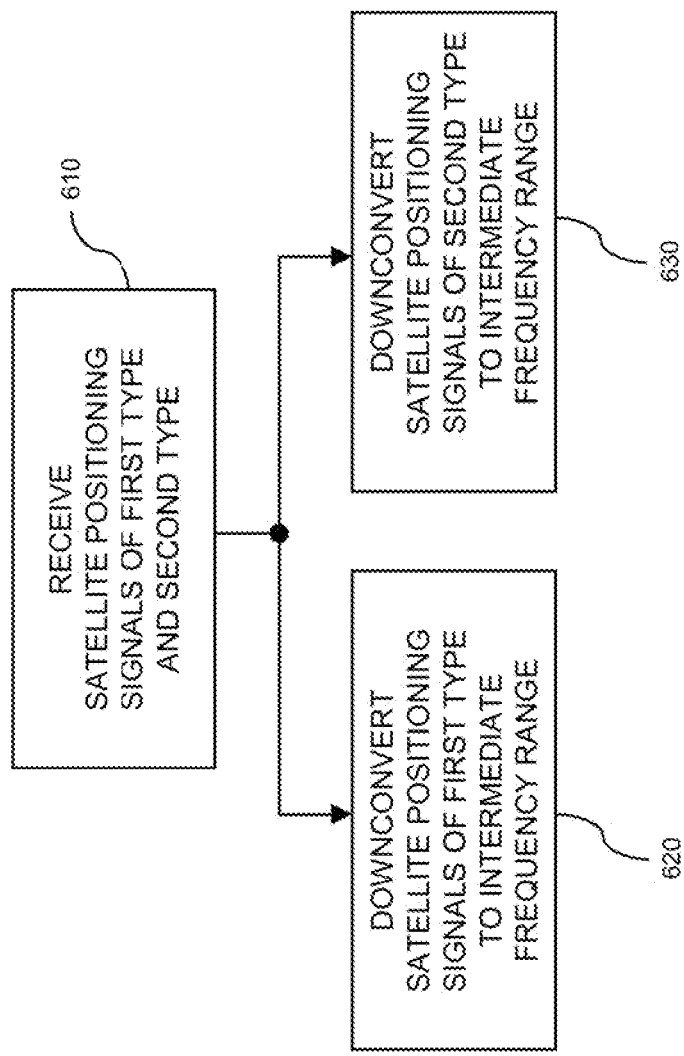
FIG. 6 shows a flowchart for schematically illustrating a method according to an embodiment of the invention.

FIG. 6 shows a flowchart for schematically illustrating a method according to an embodiment of the invention.

At step 610, satellite positioning signals of a first type and of a second type are received, e.g. in circuitry as illustrated in FIG. 3. The satellite positioning signals of the first type may be GPS satellite positioning signals, and the satellite positioning signals of the second type may be GLONASS satellite positioning signals.

At step 620, the received satellite positioning signals of the first type are downconverted to an intermediate frequency range. At step 630, the received satellite positioning signals of the second type are downconverted to the same intermediate frequency range. The intermediate frequency range may substantially cover the bandwidth of the downconverted satellite positioning signals of the first type. In an embodiment, downconversion is accomplished in such a manner that multiple neighbouring channels of the satellite positioning signals are downconverted to the intermediate frequency range and so as to be located substantially within the bandwidth of the downconverted satellite positioning signals of the first type.

The downconverted satellite positioning signals of the first and second type may then be summed so as to provide an intermediate frequency signal including a superposition of the downconverted satellite positioning signals of the first type and the downconverted satellite positioning signals of the second type. The intermediate frequency signal may then be subjected to various steps of signal processing, e.g. filtering the intermediate frequency signal so as to provide a filtered intermediate frequency signal, sampling the filtered intermediate frequency signal so as to provide digital signal samples, and/or digital downconversion of the digital signal samples so as to provide baseband signal samples. The baseband signal samples may then be further processed, e.g. subjected to code correlation, so as to generate pseudoranges.

In some embodiments, the method may also include selectively downsampling the baseband signal samples so as to compensate for a length of a ranging code of the satellite positioning signals of said first type being different from a length of a ranging code of the satellite positioning signals of the second type.

Figure 7:
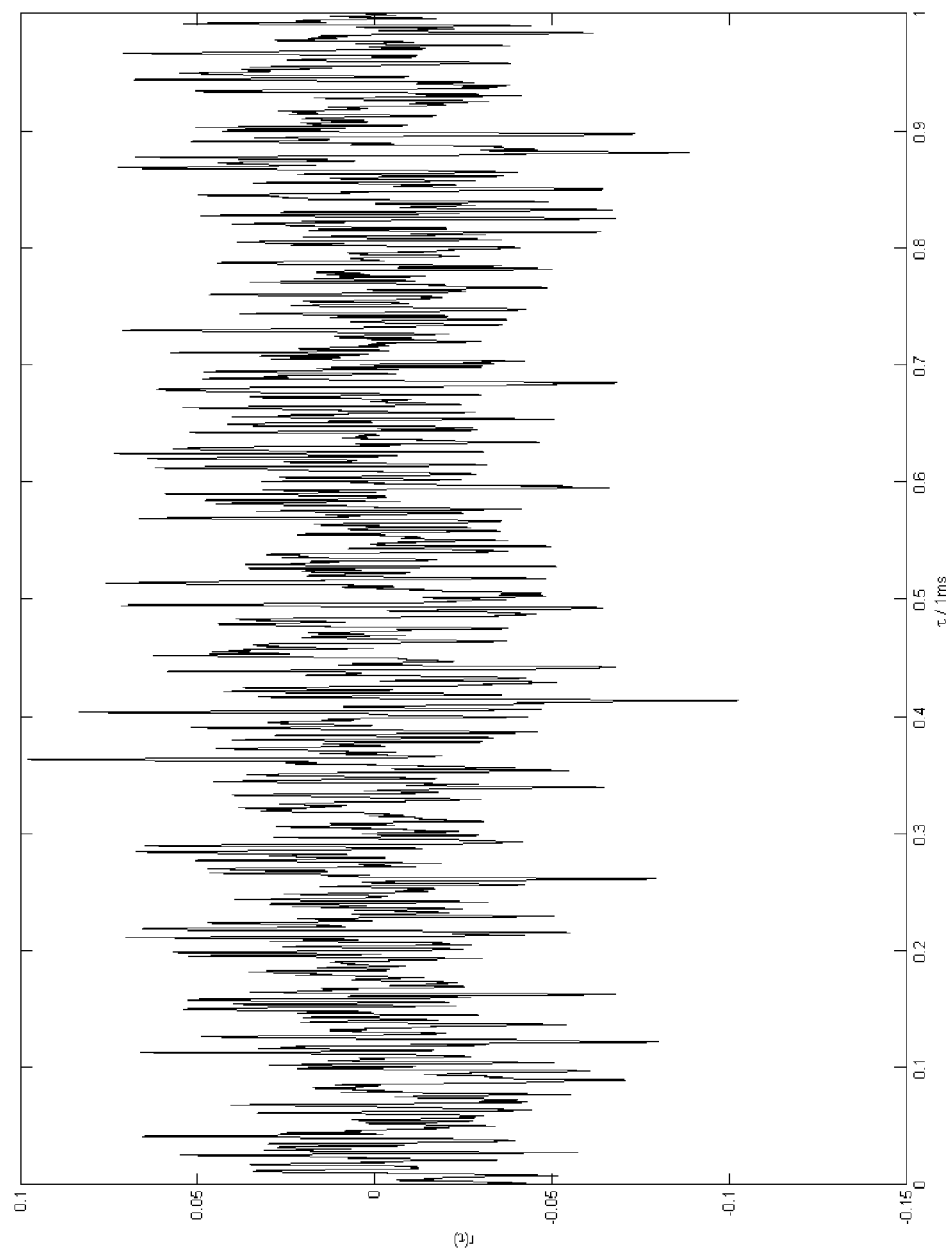
FIG. 7-9 show exemplary normalized cross-correlations of GPS satellite positioning signals and GLONASS satellite positioning signals.
Figure 8:
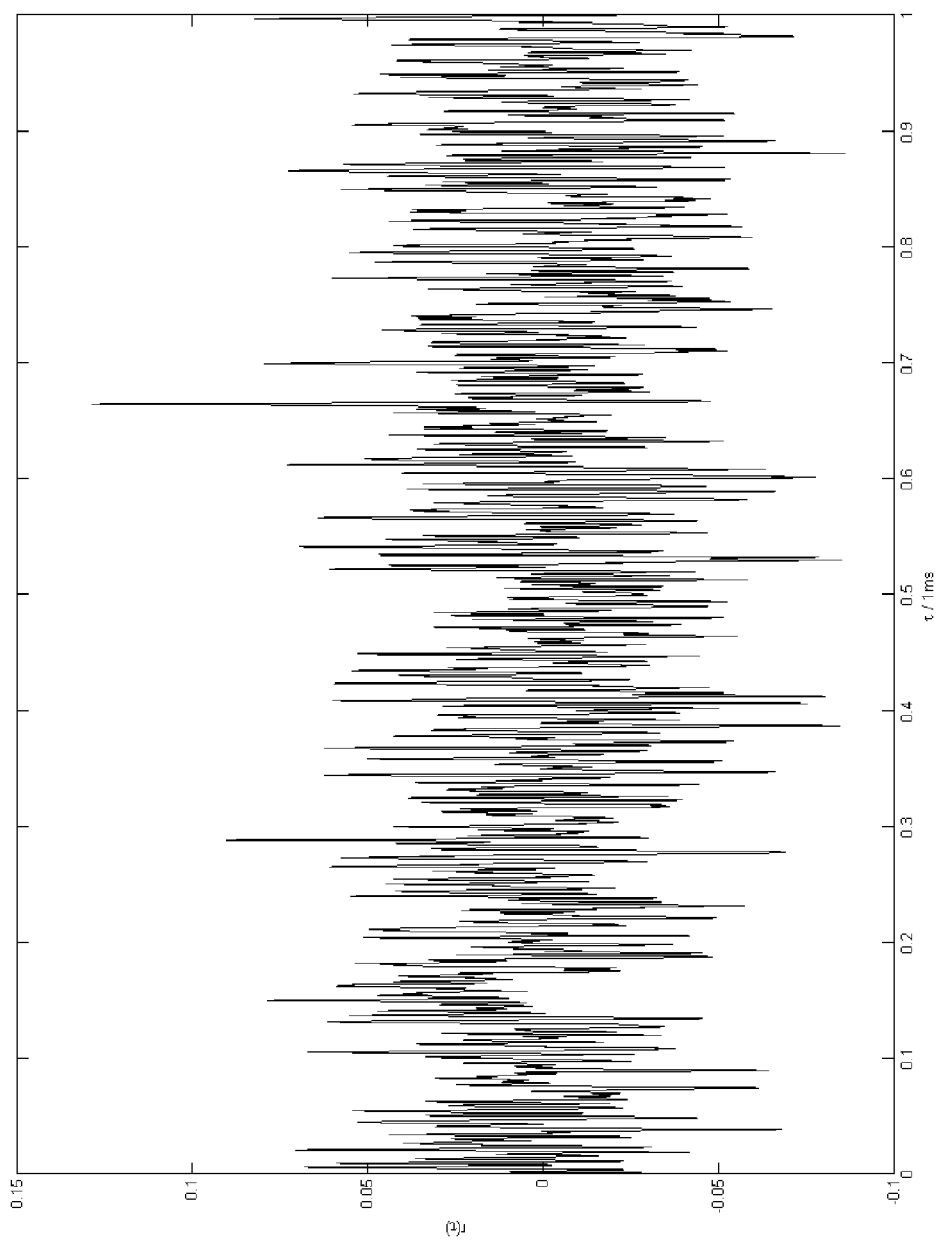
Figure 9:
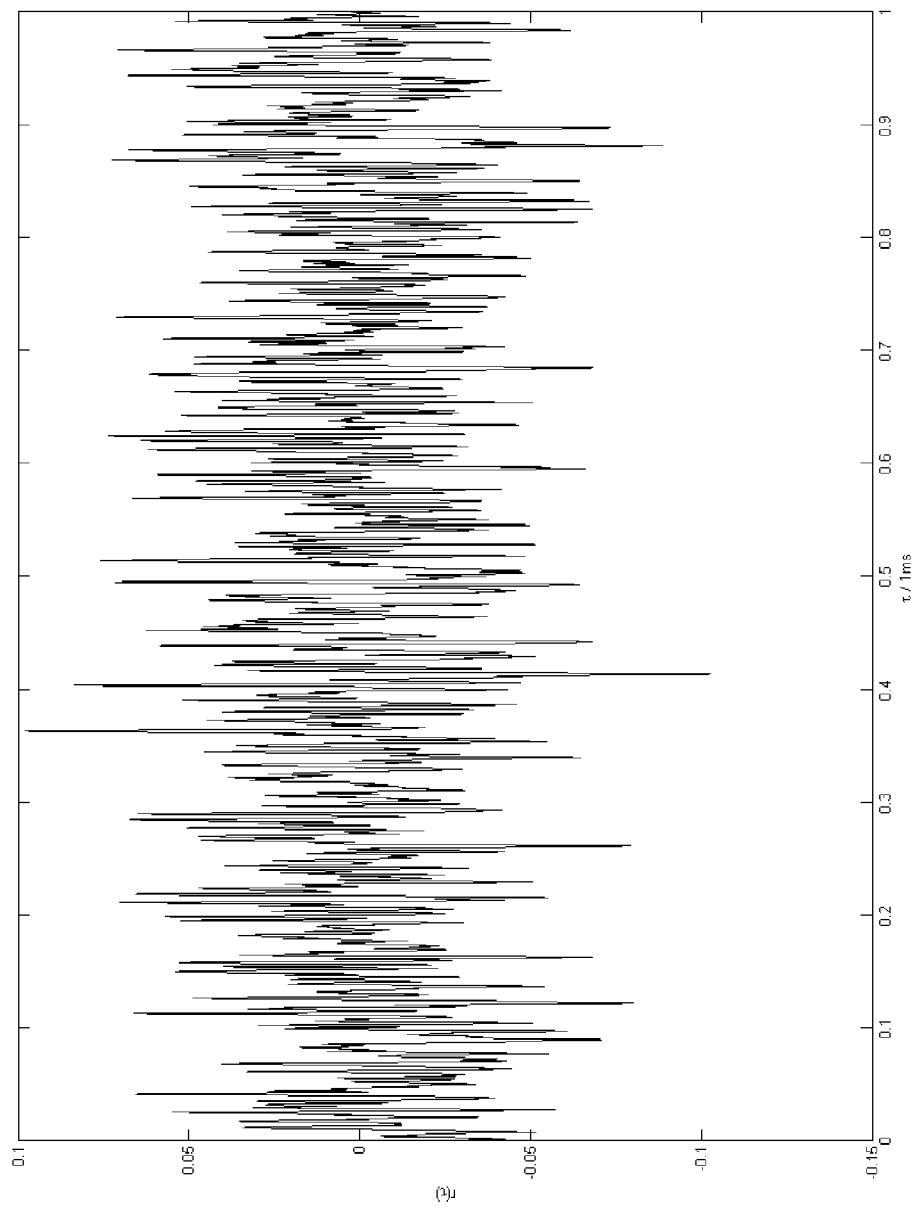

FIGS. 7-9 show exemplary normalized cross-correlations of GPS spreading sequences, each characterized by a parameter d, with the GLONASS ranging code. The parameter d is an offset between two M-sequences used to generate the Gold code individually assigned to a GPS satellite. FIG. 7 shows the normalized cross-correlation of the GLONASS ranging code with the GPS spreading sequence for d=140, FIG. 8 shows the normalized cross-correlation of the GLONASS ranging code with the GPS spreading sequence for d=258, and FIG. 9 shows the normalized cross-correlation of the GLONASS ranging code with the GPS spreading sequence for d=852. The cross-correlations of FIG. 7-9 were obtained assuming no frequency offset between the GPS satellite positioning signals and the GLONASS satellite positioning signals.

Figure 10:
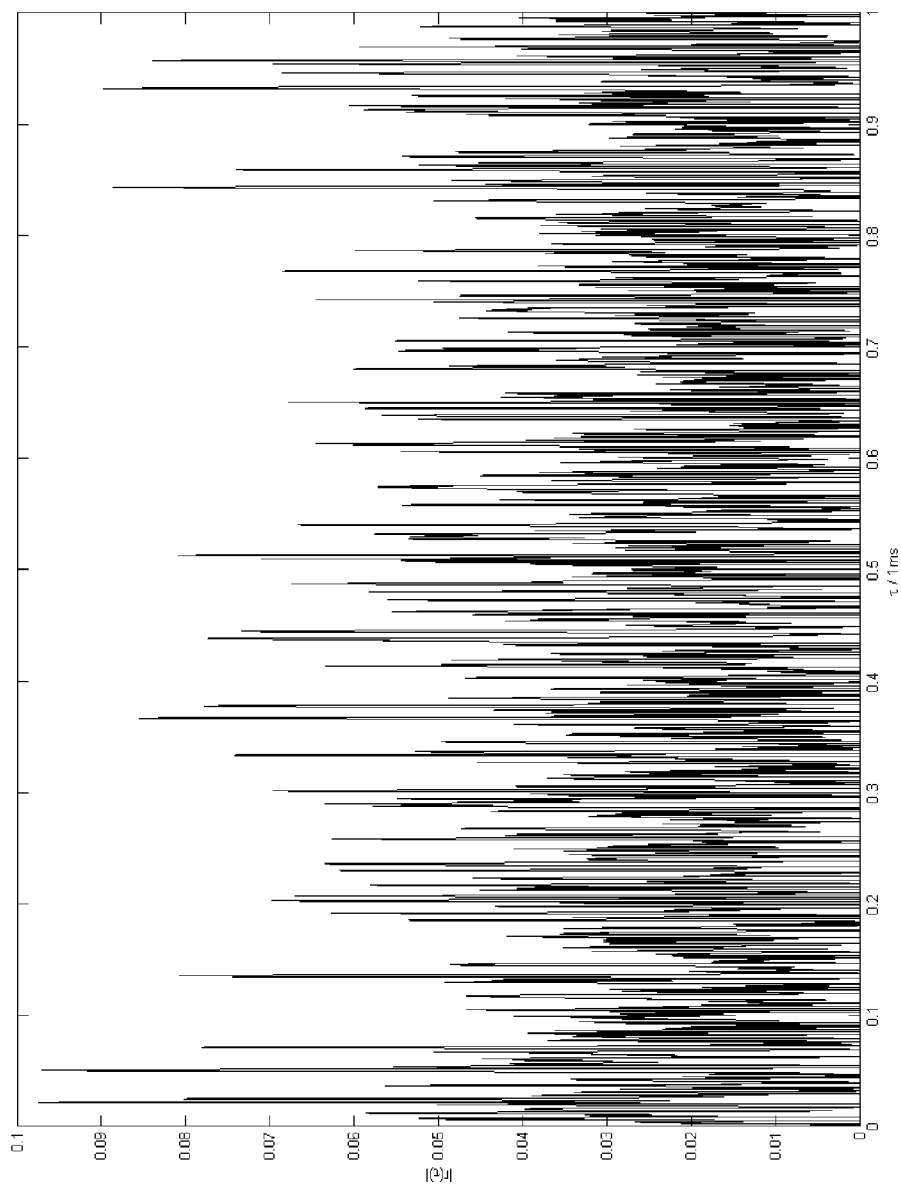
FIG. 10-12 show the modulus of the cross-correlations of FIG. 7-9, respectively, assuming a frequency offset between the GPS satellite positioning signals and the GLONASS satellite positioning signals with frequency offset.
Figure 11:
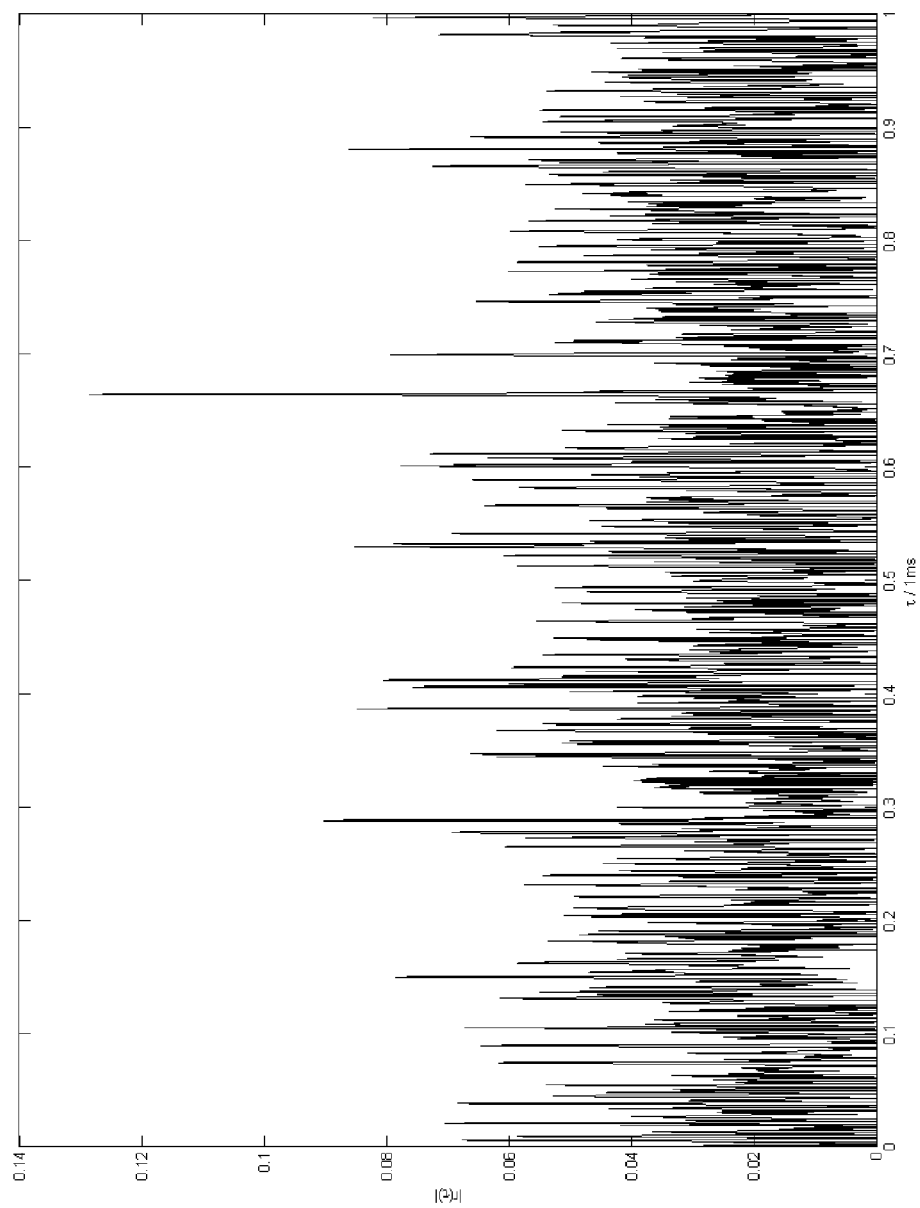
Figure 12:
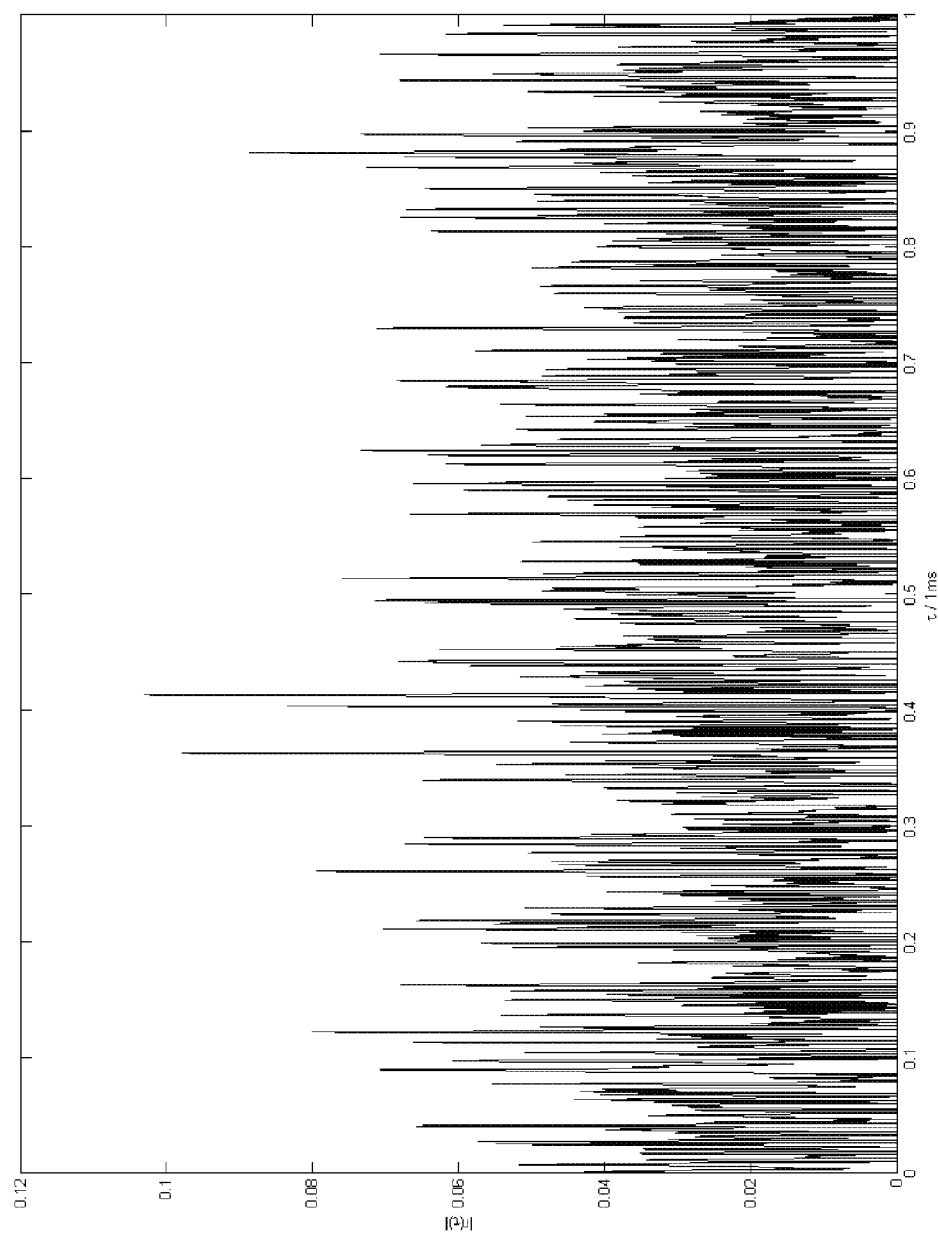

FIGS. 10-12 show the modulus of the cross-correlations in FIGS. 7-9, respectively, when assuming a frequency offset between the GPS satellite positioning signals and the GLONASS satellite positioning signals. The frequency offset was assumed to be half of the GLONASS channel frequency. More specifically, FIG. 10 shows the modulus of the normalized cross-correlation of the GLONASS ranging code with the GPS spreading sequence for d=140, FIG. 11 shows the modulus of the normalized cross-correlation of the GLONASS ranging code with the GPS spreading sequence for d=258, and FIG. 12 shows the modulus of the normalized cross-correlation of the GLONASS ranging code with the GPS spreading sequence for d=852.

As can be seen from FIGS. 7-12, the cross-correlation between the GLONASS ranging code and the GPS spreading sequence is rather small, i.e. typically has an absolute value of below 0.1. Accordingly, downconverting the GPS satellite positioning signals and the GLONASS satellite positioning signals does not significantly affect the correlation performance with respect to the individual types of satellite positioning signals.

It should be noted that the numerical values of the simulation results as shown in FIGS. 7-12 serve only for the purpose of further illustrating the concepts according to some embodiments of the present invention and are not to be construed as limiting.

Accordingly, the concepts as described herein allow to provide a highly efficient hybrid satellite positioning receiver architecture in which components are shared between subsystems handling the different types of satellite positioning signals, e.g. between a GPS subsystem and a GLONASS subsystem.

It is to be understood that the above-described embodiments serve only as examples for implementations of concepts according to the present invention, and that these concepts may be applied in various manners which are not restricted to the described embodiments.

The invention claimed is:

1. A satellite positioning receiver, comprising:
   a first receive path configured to downconvert received satellite positioning signals of a first type to an intermediate frequency range; and
   a second receive path configured to downconvert received satellite positioning signals of a second type to said intermediate frequency range.

2. The satellite positioning receiver according to claim 1, comprising:
   a summing node coupled to both the first receive path and the second receive path and configured to provide an intermediate frequency signal, said intermediate frequency signal comprising a superposition of the downconverted satellite positioning signals of said first type and the downconverted satellite positioning signals of the second type.

3. The satellite positioning receiver according to claim 2, comprising:
   a band-selection filter coupled to the summing node and configured to filter the intermediate frequency signal.

4. The satellite positioning receiver according to claim 3, wherein the band-selection filter has a bandpass characteristic with a pass-band width substantially corresponding to the bandwidth of the downconverted satellite positioning signals of that type which has the largest bandwidth.

5. The satellite positioning receiver according to claim 2, comprising:
   an analog-to-digital converter coupled to the summing node and configured to sample the intermediate frequency signal so as to provide digital baseband signal samples.

6. The satellite positioning receiver according to claim 5, comprising:
   a correlation engine coupled to the analog-to-digital converter and configured to perform code correlation on the basis of the baseband signal samples.

7. The satellite position receiver according to claim 6, comprising:

a sampling rate converter configured to be selectively coupled between the analog-to-digital converter and the correlation engine.

8. The satellite position receiver according to claim 7, wherein the sampling rate converter provides a downsampling factor selected to correspond to a ratio between a ranging code length of the satellite positioning signals of said first type and a ranging code length of the satellite positioning signals of said second type.

9. The satellite positioning receiver according to claim 1, comprising:
a prefilter coupled to both the first receive path and the second receive path so as to provide a filtered receive signal to both the first receive path and the second receive path, said filtered receive signal comprising both the satellite positioning signals of said first type and the satellite positioning signals of said second type.

10. The satellite positioning receiver according to claim 1, comprising:
an amplifier coupled to both the first receive path and the second receive path so as to provide an amplified receive signal to both the first receive path and the second receive path, said amplified receive signal comprising both the satellite positioning signals of said first type and the satellite positioning signals of said second type.

11. The satellite positioning receiver according to claim 1, comprising:
a prefilter and an amplifier arranged in series and coupled to both the first receive path and the second receive path so as to provide a filtered amplified receive signal to both the first receive path and the second receive path, said filtered amplified receive signal comprising both the satellite positioning signals of said first type and the satellite positioning signals of said second type.

12. The satellite positioning receiver according to claim 1, wherein the satellite positioning signals of said first type comprise satellite positioning signals originating from different positioning satellites and being distinguishable on the basis of individual spreading sequences respectively assigned to the positioning satellites, and
wherein the positioning signals of said second type comprise satellite positioning signals originating from different positioning satellites and being distinguishable on the basis of individual carrier frequencies respectively assigned to the positioning satellites.

13. The satellite positioning receiver according to claim 1, wherein the positioning signals of said first type are GPS satellite positioning signals.

14. The satellite positioning receiver according to claim 1, wherein the positioning signals of said second type are GLONASS satellite positioning signals.

15. An electronic device, comprising:
a first receive path configured to downconvert GPS satellite positioning signals to an intermediate frequency range,
a second receive path configured to downconvert GLONASS satellite positioning signals received on four neighbouring GLONASS channels to said intermediate frequency range, a summing node coupled to both the first receive path and the second receive path and configured to provide an intermediate frequency signal, said intermediate frequency signal comprising a superposition of the downconverted GPS satellite positioning signals and the downconverted GLONASS satellite positioning signals,
an analog-to-digital converter coupled to the summing node and configured to generate digital baseband signal samples from the intermediate frequency signal; and
a digital baseband processing path coupled to the analog-to-digital converter and configured to produce pseudoranges on the basis of the baseband signal samples.

16. The electronic device according to claim 15, wherein the digital baseband processing path comprises a correlator configured to selectively perform code correlation of a GPS ranging code and of a GLONASS ranging code.

17. The electronic device according to claim 16, wherein the digital baseband processing path comprises a sampling rate converter configured to apply downsampling by a factor of two to the baseband signal samples provided to the correlator if the correlator is to perform code correlation of the GLONASS ranging code.

18. The electronic device according to claim 15, comprising:
a single prefilter coupled to provide input signals to both the first receive path and the second received path.

19. The electronic device according to claim 15, comprising:
a single amplifier coupled to provide input signals to both the first receive path and the second receive path.

20. The electronic device according to claim 15, comprising:
a single postfilter coupled between the summing node and the analog-to-digital converter.

21. A method, comprising:
receiving satellite positioning signals of a first type and of a second type;
downconverting the received satellite positioning signals of said first type to an intermediate frequency range; and
downconverting the received satellite positioning signals of said second type to said intermediate frequency range.

22. The method according to claim 21, comprising:
summing the downconverted satellite positioning signals of said first type and the downconverted satellite positioning signals of the second type so as to provide an intermediate frequency signal comprising a superposition of the downconverted satellite positioning signals of said first type and the downconverted satellite positioning signals of the second type.

23. The method according to claim 22, comprising:
filtering the intermediate frequency signal so as to provide a filtered intermediate frequency signal.

24. The method according to claim 23, comprising:
sampling the filtered intermediate frequency signal so as to provide digital baseband signal samples.

25. The method according to claim 24, comprising:
processing the baseband signal samples so as to generate pseudoranges.

26. The method according to claim 24, comprising:
selectively downsampling the baseband signal samples so as to compensate for a length of a ranging code of the satellite positioning signals of said first type being different from a length of a ranging code of the satellite positioning signals of the second type.

* * * * *